(12) United States Patent
Sitnik (10) Patent No.: US 6,300,880 B1
(45) Date of Patent: *Oct. 9, 2001

(54) MULTICHANNEL AUDIO DISTRIBUTION SYSTEM HAVING PORTABLE RECEIVERS

(75) Inventor: Eran Sitnik, Ossining, NY (US)

(73) Assignee: Philips Electronics North America Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/587,191

(22) Filed: Jan. 16, 1996

(51) Int. Cl.$^7$ ..................................................... H04Q 1/00
(52) U.S. Cl. ................. 340/825.25; 340/5.9; 340/572.1; 235/375; 235/383; 235/462.46; 705/10; 705/14
(58) Field of Search ........................ 340/825.24, 825.25, 340/825.34, 825.35, 825.49; 84/609; 381/80, 81; 359/136; 369/24, 30, 32–34; 370/487; 375/200; 455/2, 4.1, 4.2, 5.1, 161.2; 345/167; 235/375, 462, 383, 472.02, 462.46; 348/7; 380/10, 20; 465/45; 379/101.01

(56) References Cited

U.S. PATENT DOCUMENTS

| 4,430,669 | * | 2/1984 | Cheung | 380/20 |
| 4,465,926 | * | 8/1984 | Apitz | 235/472.02 |
| 4,780,599 | * | 10/1988 | Baus | 235/383 |
| 4,788,675 | * | 11/1988 | Jones et al. | 370/487 |
| 4,797,918 | * | 1/1989 | Lee et al. | 380/20 |
| 4,807,222 | * | 2/1989 | Amitay | 359/146 |
| 4,916,441 | * | 4/1990 | Gombrich | 345/167 |
| 4,975,926 | * | 12/1990 | Knapp | 375/200 |
| 5,146,612 | * | 9/1992 | Grosjean et al. | 455/45 |
| 5,237,157 | * | 8/1993 | Kaplan | 235/375 |
| 5,237,610 | * | 8/1993 | Gammie et al. | 380/10 |
| 5,442,456 |   | 8/1995 | Hansen | 358/342 |
| 5,464,946 | * | 11/1995 | Lewis | 84/609 |
| 5,475,874 | * | 12/1995 | Klos | 455/161.2 |
| 5,477,215 | * | 12/1995 | Mandelbaum | 340/825.34 |
| 5,512,934 | * | 4/1996 | Kochanski | 348/7 |
| 5,541,638 | * | 7/1996 | Story | 348/7 |
| 5,557,541 | * | 9/1996 | Schulhof et al. | 348/7 |

FOREIGN PATENT DOCUMENTS

0618526A2   10/1994  (EP) .
0658855A1   6/1995   (EP) .

* cited by examiner

*Primary Examiner*—Edwin C. Holloway, III
(74) *Attorney, Agent, or Firm*—Michael E Belk (57) ABSTRACT

A multichannel switched communication system having a plurality of communication channels, with a plurality of information records stored in a database relating to a plurality of identified objects; a database server system for selectively accessing information records based on a selection criteria; a common input, receiving the selection criteria associated with an identification of a receiver, the selection criteria including object identification information; and a multichannel distribution system capable of simultaneously transmitting a plurality of information records, for transmitting the selectively accessed information record to the identified receiver. A plurality of mobile receivers each receives a desired broadcast on one of a plurality of channels. A bar code scanner associated with a mobile receiver identifies desired information record for retrieval. An infrared or radio frequency communication system may be provided for transmitting control data from the mobile receiver.

15 Claims, 5 Drawing Sheets

| SELECTION CRITERIA | INFORMATION RECORD |
|---|---|

FIG. 5

| OBJECT IDENTIFIER | SEL. CRIT. 1 | SEL. CRIT. 2 | SEL. CRIT. 3 | AUDIO INFORMATION 1 | AUDIO INFORMATION 2 |
|---|---|---|---|---|---|

MULTICHANNEL AUDIO DISTRIBUTION SYSTEM HAVING PORTABLE RECEIVERS

FIELD OF THE INVENTION

The present invention relates to an apparatus and method for providing an audio information signal to a portable receiver, in which a plurality of receivers are serviced by a single information transmitter system, and in which the received information content is selected or influenced by a user and directed specifically to that user. The present invention also relates to a wireless receiver information retrieval database system which operates in an environment, allowing mobility of a user within the environment while receiving selected audio information.

BACKGROUND OF THE INVENTION

Various systems for providing personalized information to mobile users are known. These include systems dedicated for this functionality, and those which incidentally include this functionality. The simplest systems are mobile half or full duplex radio transceivers, which allow sharing of a single transmission channel or pair of channels with any number of users. These systems may be used with voice or data. Another type of communication system is the known switched telephone system, in which voice and/or data is communicated on dedicated channels between users, with a central switch controlling the linking. A further type of communication system employs an addressed packet communication system in which packets of information are addressed to a recipient over a common channel, thereby allowing a large number of users to share a common channel. Spread spectrum systems allow independent communication between transceivers over a shared radio frequency band, particularly where band occupancy is low.

In order to avoid the need for decoding addresses for each information packet, multiple communications channels are employed. Such systems include physical communications media, such as copper wire and optic fiber, as well as wireless channels which may vary in frequency, timing, polarization, or other characteristic which allows selection at the receiver regardless of the data content of the channel. Thus, cellular telephone systems exist which allow multiple frequency bands (FDMA) or timeslots (TDMA) to be employed for full duplex analog or digital communications (CPDP).

Cellular telephone transceivers may be used with known information distribution systems to provide a selective information distribution to mobile users based on a selection criteria provided by the user. Thus, various dial-up databases and phone-messaging systems may be accessed through wireless transceivers. Unidirectional and bi-directional paging systems are known, in which many users share a common transmission medium and common communications channel with addressed packet messages. Bi-directional pagers may employ a separate and/or different communication system for data uplink. Low power systems are known which allow point-to-point communications of voice or data over channels within a band, or via spread spectrum communications.

Known systems allow the storage and retrieval of music on a database server system, which may be accessed through telephone systems, computer networks or the Internet. These systems provide, in the various implementations, dedicated send and receive channels for each user, an addressed packet information delivery transmission protocol, or a combination thereof. These systems generally provide symmetric data links, employing the same protocol and data transmission formats for both uplink and downlink. Asymmetric data links are also known, but such systems generally employ addressed packet information in a high speed downlink and multiple dedicated communication channels in an uplink.

Systems are also known, e.g., Internet, which convert information from a dedicated channel to a common channel with addressed information packets.

Radio frequency uplink bar code scanners are known, which scan a bar code of an object and uplink the code to a centralized system. Further, systems are known wherein multiple bar code terminals may operate simultaneously with a central database system. In addition, it is known to provide a terminal for use by a person, having a bar code scanner and which receives information resulting or relating to a bar code scan from a central system, through a wireless link. These systems are generally used for digital data transmission in automated inventory and warehousing applications. Virtual reality simulations may include audio signals presented to a user through a wireless link. Bar code equipped terminals may also be fitted with audio output devices. One such known system is a supermarket cash register with integral bar code scanner and voice synthesis, which is connected to a central database for bar code-based look-up and return of product identification and pricing information.

Infrared communications are known, and with a number of emerging standards, such as IrDA. In these systems, an infrared LED is digitally modulated at a high data rate to illuminate an environmental area with a beam including the signal. A photodetector, generally a silicon bipolar device based detector, receives the infrared signal, which is generally processed to suppress background illumination effects and demodulate the signal. It is known to transmit audio information using such methods, such as to wireless headphones or speakers.

A video cassette recorder system manufactured by Matsushita provides a bar code scanner which transmits control sequences via an infrared beam to a VCR. As a result of these transmitted sequences, the VCR may reproduce a desired audio-visual sequence. Optical disk systems are also known in which addressing information is provided through a bar code reader, and so that a portion of the information stored on an optical video-disk is retrieved and presented based on a printed bar code which is scanned.

U.S. Pat. No. 5,475,874, incorporated herein by reference, relates to a system for the tuning of a broadcast radio receiver to a receive a signal from a transmitter of a certain type of program using RDS (radio data system) information. The broadcast radio receiver is first tuned to receive a convenient program signal, which is in accordance with the wishes of the listener. The PTY (program type information) information retrieved from the RDS data of such transmitter is stored by operation of an associated control element in order to set a filter, whose filter condition is the agreement with such PTY information. For subsequent tuning of the broadcast radio receiver to another program, as for example by means of a search sweep, such program is only considered to be suitable for reception if it fulfills the filter condition. PTY information is a standardized characteristic indicating the type of program, which is broadcast by the respective transmitter, as for instance news services, sporting news, entertainment music or classical music.

U.S. Pat. No. 5,477,215, incorporated herein by reference, relates to a system for simultaneously interrogating a plurality of portable data cards. Operable over a plurality of radio frequencies, the interrogation system sequentially communicates with each portable data card as it comes within communication range on a first one of the plurality of radio frequencies for determining a unique identification number associated with each data card. Once the identification number for a card is obtained by the interrogation system, a predetermined transaction, such as deactivating an electronic barrier to entering a limited access area, for the holder of the identified card is initiated. The interrogation system then selects and moves with each card to a different one of the plurality of radio frequencies for completing a data transfer portion of the transaction. The interrogation system simultaneously completes each predetermined transaction of reading from and writing data to each one of the plurality of cards while communicating with each card on the respectively selected ones of the plurality of radio frequencies.

U.S. Pat. No. 5,464,946, incorporated herein by reference, relates to a system for interactive multimedia entertainment that stores a plurality of video and/or songs and allows for the receipt of information concerning the cost of each song and other relevant information. The system has application to music listening, video entertainment and Karaoke entertainment systems.

It is also known to store audio information, as samples or synthesized music or voice, in a semiconductor memory device. Technologies used for this storage include masked ROM, EPROM, EEPROM, multivalued stored charge potentials, and RAM.

The known systems may be expensive, both in equipment cost, and in the opportunity cost of the radio frequency spectrum usage. Further, these systems do not provide for simple automated identification of an object concerning which information is desired with subsequent automated receipt of an audio signal regarding that object.

SUMMARY OF THE INVENTION

The present invention therefore provides a system adapted for distribution of differing information to a plurality of mobile users. The distributed information is preferably audio information. Each of the mobile users may individually select desired information. This system generally has asymmetric data communications requirements, with the selection information corresponding or relating to specific information and the information itself being a real time analog data stream. Thus, the selection and the delivery, also known as the uplink and downlink, are quantitatively and qualitatively different. The system according to the present invention thus separates these communications functions.

Because of the nature of the information to be delivered, it is preferred that separate communications channels be provided for each mobile receiver. Thus, the receiver need only select the appropriate channel to receive the selected information. Optionally, multiple receivers may be assigned the same channel, or channel assignments may change during information delivery.

Accordingly, the present invention provides an efficient mobile receiver design and communications system adapted for use in a retail environment by consumers. The operation of the device requires little training and information delivery is automated.

It is therefore an object according a first embodiment of the present invention to provide a multichannel switched communication system having a plurality of communication channels, comprising a plurality of information records stored in a database relating to a plurality of identified objects; a database server system for selectively accessing information records based on a selection criteria; and a multichannel distribution system capable of simultaneously transmitting a plurality of selectively accessed information records on different channels, characterized in that a common input receives a plurality of selection criteria associated with an identification of a receiver, said selection criteria including object identification information.

It is also an object according to the present invention to provide a multichannel switched communication system further comprising a plurality of receivers, each of said receivers having an audio transducer for producing audio information relating to said selectively accessed information record and a data input for transmitting information relating to said selection criteria to said common input. The information records may comprise audio information, preferably music. The database system may retrieve information based on an identity of a musical work, and said selection criteria may include an identification of a portion of a compilation of musical works. It is another object according to the present invention to provide a system for identifying a portion of a musical compilation to be transmitted. The identifying system may include a database of user characteristic information, each of said receivers being associated with a user, said selecting means accessing user characteristic information associated with each user.

It is a further object according to the present invention to provide a multichannel switched communication system wherein said multichannel distribution system transmits to said receivers using a frequency division multiplex scheme and said receivers transmit to said common input with addressed information packets. The receivers may transmit to said common input through an infrared beam and said multichannel distribution system transmit to said receivers through a radio frequency channel.

It is a further object according to the present invention to provide a multichannel switched communication system having a command input associated with each of said receivers for controlling said selecting means.

It is a still further object according to the present invention to provide a multichannel switched communication system having a plurality of receivers, wherein each of said receivers comprises a portable housing, a pair of headphones, and a bar code reader. In a preferred embodiment, said bar code reader comprises an LED and a semiconductor photodetector, said LED being further modulable to transmit information to said database server system, and said photodetector detecting modulated optical information from said database server system, whereby in a first operation, a bar code present on an object is scanned by light emitted by said LED and detected by said photodetector, and in a second operation said LED transmits bar code data to said database server system. During said second operation, said photodetector may detect an absence of other optical data transmission prior to said LED transmitting bar code data. Optionally, in a third operation, a confirmation of transmission is transmitted optically from said database server system to said photodetector; or by said multichannel distribution system over said identified communications channel.

According to one aspect of the present invention, said receivers may transmit selection data by radio frequency modulated signal to said database server system and said identified receiver is a radio frequency receiver. Optionally, said receivers transmit a digitally modulated radio frequency signal on a common signaling channel.

According to another aspect of the present invention, selection information is input by a bar code reader, reading a bar code on a product. Preferably, the bar code is imprinted on audio recording packaging. More preferably, said information records correspond to audio recordings, said bar code corresponding to a compilation of audio recordings, and the system further comprises means for selecting a portion of said compilation for transmission.

It is another object according to the present invention to provide a multichannel switched communication system having a database for storing information relating to said identification of said receiver, said database server system selectively accessing information records based on said selection criteria and said information relating to said identification of said receiver.

It is an object according to a second embodiment of the invention to provide a multichannel communication system having a plurality of communication channels, operating in an environment having a plurality of objects each having an identification, comprising a plurality of stored information records including audio information; a transmitter, for transmitting at least two of said plurality of stored information records on different channels; a receiver, selectively receiving said transmitted information from one of said channels; and an audio transducer for reproducing said audio information included in said received information, characterized in that said selected received information is based on an identification of an object; said identification of said object being obtained by an object identification system associated with said receiver.

It is an object according to a further embodiment of the invention to provide a communication transceiver comprising a wireless electromagnetic receiver for receiving a transmitted stereo audio signal transmitted on a channel in a band, said band having a plurality of channels; and a pair of audio transducers for producing stereo audio information from said received stereo audio signal, characterized in that the communication transceiver includes a sensor for reading stored information in a storage medium proximate to said sensor; and an information transmitter for broadcasting said sensed stored information.

It is a further object according to the present invention to provide a transceiver wherein said wireless receiver may optionally be assigned a predetermined channel of said band, or select said channel digitally or by scanning said channels of said band and comparing said signal to said criterion.

It is another object according to the present invention to provide a transceiver in which the sensor is optionally a bar code reader, an optical indicia reader, a magnetic information sensor, a radio frequency identification sensor or an electronic serial number sensor.

It is still another object according to the present invention to provide a transceiver wherein said information transmitter transmits information optionally on a modulated infrared beam or on a modulated radio frequency wave, which may be the same communications channel as the information transmission.

These and other objects will become apparent through a review of drawings and the detailed description of the preferred embodiments.

BRIEF DESCRIPTION OF THE DRAWINGS

These and other features in accordance with the invention are illustrated, by way of example, in specific embodiments of the invention now to be described with reference to the accompanying drawings, in which.

DETAILED DESCRIPTION OF THE PREFERRED EMBODIMENTS

The preferred embodiments of the present invention will now be described with reference to the Figures. Identical elements in the various figures of the present invention are designated with the same reference numerals.

The present system comprises a number of components, including a mass store of information, an information record retrieval system, optionally a information sub-selection system, a multichannel information transmission system, a mobile receiver, and an information-bearing channel selection system.

The mass storage system and information retrieval system are referred to herein as the central system. This central system may be modular, dispersed, and or include redundant elements. In fact, a plurality of "central systems" may be provided, with each central system being capable of servicing a plurality of receivers.

Thus, in one aspect, a central system maintains a library of information relating to a plurality of predefined objects, each object having an identification, a system for simultaneously transmitting the information from the library to a plurality of receivers through communications channels, and a plurality of mobile receivers each for receiving the information, based on the identification, from the communications band or a channel within the band and presenting the information through an output to the user. The information is preferably audio information, and the output is preferably a portable audio transducer. Further, the desired object identification may be provided from each of the mobile receivers and uplinked to the central system, or processed locally at the mobile receiver to select an appropriate channel.

Thus, a signal may be transmitted from a portable receiver to a database system identifying an object in the environment about which audio information is desired. A data base, which stores the audio information, may be accessed and a corresponding database record transmitted. The portable receiver then receives the audio information. The transmitted signal identifying the audio information is preferably a coded signal, including digital information, but may also be semantic instructions or analog data. The database management system services a plurality of receivers simultaneously, and thus includes a system for supplying audio information essentially in real time to a plurality of receivers. This means that audio information is reproduced without unintended gaps, at a normalized speed; however, the present system tolerates a limited latency in commencing delivery of audio information and may deliver a limited amount of audio information, instead of an entire composition or compilation.

Mass Store

The system includes a mass store device, which preferably stores audio information. This audio information is more preferably music, and may be in the form of musical clips, songs or compilations. For example, music is commonly distributed on audio compact disks (CDs), and therefore the mass store may comprise a jukebox for housing and accessing a plurality of such distributed audio CDs. The mass store may also comprise specially produced CDs having a number of songs, selections or portions of songs, which may be from many different sources. Other formats are known, such as compact disk read only memory (CD-ROM) and recordable compact disk read only memory (R-CD-ROM), which may be used to store audio data in various formats, including compressed formats, and which are addressed by a computerized device. Further, the mass store may comprise magnetic or semiconductor memory devices, as known in the art.

A number of known systems are available for storing the audio information relating to the objects. Where the objects are compact disks containing music, these may be placed in a jukebox system. One copy of each musical CD is stored in the jukebox system, which may potentially accommodate hundreds or thousands of CDs. Generally, however, the scale of such systems will be larger than desired in a typical retail environment. In this case, the jukebox system may be physically separate from the retail environment, and in fact such a jukebox system may service a number of individual retail environments. A plurality of telecommunications links may therefore be provided from a centralized jukebox to service many retail outlets. In this instance, a three level architecture exists: the centralized information database server, a plurality of transmitters each for communicating with a plurality of mobile receivers, and the receivers themselves. Where an entire CD compilation of music is stored in a jukebox, it is generally desired that only a small portion of the stored information be delivered. For example, copyright and administrative convenience allows a typical CD from inventory to be placed in the jukebox without significant customization or processing. For example, a CD may be identified with its own manufacturer's packaging bar code. As stated above, where the stored information exceeds the desired level of delivered information, a selection process is required to limit the information delivery. While a simple criterion, e.g., "first 45 seconds of first track of CD" may be employed, more sophisticated criteria are possible, and may be preferable, e.g., where a user has already heard the first track or has otherwise indicated a different preference. A jukebox system potentially allows override of default and access to the full album or any selection thereon.

Where telecommunication links are employed to deliver information, these may be ISDN (BRI or PRI), T1, T3, frame relay, ATM, STM or other digital data communications standards. In some circumstances, microwave or other type links may be appropriate. Therefore, the inefficiency of dedicating a sample of each CD or a dedicated music reproduction apparatus for previewing is minimized.

In a library or database system, a portion of a CD or other recording may be copied onto a different medium, which may be magnetic disk storage, such as a 9 GByte disk or RAID (redundant array or inexpensive disks), magnetic tape, WORM (write once read many optical disk), recordable CD-ROM, pressed CD or CD-ROM, multiple layer optical disk, e.g., Toshiba, Philips and Sony's Digital Video Disk (DVD), blue laser diode optical disk, or other known mass storage technologies. Therefore, a preselection process is implemented to winnow possibly hundreds or thousands of gigabytes of data into tens or hundreds of gigabytes of data, allowing a compact and less expensive retrieval system. For example, between 45 sec. to 5 minutes of each CD album compilation may be stored, allowing between about 15–100 albums to be represented on a single CD using standard recording format. Using custom formats and/or compression, further storage efficiency may be gained. Thus, instead of addressing an entire disk, with a further selection of a portion to be reproduced, as described in the above embodiment, selections are generally limited to songs or portions of songs on disks. Where clips of songs are employed, for example 45 seconds, the number of clips may exceed the reasonable addressing capability of the retrieval system. Therefore, it may be advantageous to employ a different storage protocol, for example employing recordable CD-ROM with data compression or possibly a multimedia data storage which includes further data relating to the selection, such as price, availability, information about the artist, images, or other audio, video or text information and related albums. In this case, a digital data standard rather than the audio CD data storage standard is employed. This also facilitates high speed access to stored data, e.g., quadruple speed access or higher. The central system may contain the complete audio recording of each selection, a portion of each selection, a subset collection or recordings, or other information. In order to supply these selections to a plurality of mobile receivers simultaneously, the stored information, in whatever format, e.g., audio CD, CD-ROM, tape, hard disk, solid state storage medium (Flash EPROM, ROM, etc.), or multilayer optical disk, may be transferred at greater than real time to a buffer memory storage, such as fast hard drive or RAM, and delivered in real time to the user over a selected channel. Since the user may have related requests, information relating to the selection may be maintained immediately available or buffered as the clip is playing, so long as the system resources are not otherwise required. A multichannel transmitter is fed with the various simultaneous clips, and is broadcast over a band. The transmission may occur in real time or faster than real time, with a buffer. Further, with a transmission latency, the transmission may also occur slower than real time, also with a buffer.

According to another embodiment, a central system is provided having a limited mass storage capability, e.g., a 2 GByte magnetic hard disk or 6 or 7 disk CD-ROM changer. This system is provided for supplying information-on-demand, e.g., short clips of various musical CDs, which are stored. The audio data may also be compressed to increase storage efficiency. In this case, the information storage may be easily updated, e.g., by replacing the CD-ROMs or modifying the stored information on the hard disk drive. In a still further embodiment, a number of CDs, CD-Is (compact disk-interactive) or CD-ROMs are produced which contain edited selections. These are loaded into a jukebox system, e.g., 25–50 disks with one or more quad or higher speed player. This jukebox may be accessed using standard methods, with selections buffered for apparent simultaneous access and real time presentation to users.

The present system also allows use of the portable receivers with other types of information feeds, such as retransmission of broadcast channels, or on line information. Further, the present system may be used to provide a selectable background music presentation system, delivered individually.

The data storage system may also include magnetic tape, wherein information is encoded on the tape in frequency domain multiplexed format, thereby allowing direct modulation of an output of a tape player as a frequency domain multiplexed format transmission.

Information Retrieval System

The information retrieval system from the mass store device is generally standard, and performs the function of identifying the information record to be accessed, accessing the information record, and retrieving the data. In this case, the identification function may be simply a translation of selection information to a database record identifier, or a more complex function performed by a separate subsystem. This separate subsystem, according to the present invention, may operate on one or more information records in the mass store, as well as information stored in a separate database system relating to the information to be retrieved, the user, and/or an operator of the system.

Thus, where a plurality of CDs are stored in a jukebox, each may be addressed by a unique code assigned to it, for example, an UPC code on the original CD packaging. Thus, input of a UPC will retrieve the CD with the corresponding UPC code. An audio CD, however, may store about 74 minutes of musical information. Therefore, the system may deliver a predetermined portion of the content of the CD, for example, 45 seconds of the first cut on the CD, or other portion determined by an operator. The system may also adaptively deliver information based on various criteria.

Therefore, where, e.g., a 45 second clip of a song from a CD musical album is predefined, this will be transmitted to the receiver in response to the object identification. Where the information to be transmitted is not fully defined, an associated database may be provided which includes selection information, such as an editorially selected clip of an album. Therefore, this auxiliary data, in conjunction with the object identification, is used to define the transmitted information. In another embodiment, the information to be transmitted is adaptively determined, based on the object identification other information, such as the past use of the device by the user, demographic information about the user, or an analysis of the stored information. In this case, the object identification initiates a processing step to define the content of the transmission, which is subsequently transmitted. In a still further embodiment, a third party, such as retail establishment management, uses the object identification to define the information to be transmitted, which need not relate in any rational manner to the identified object itself.

Therefore, in order to determine the audio information content delivered to a user, data associated with a particular receiver or user may be provided to the centralized system. This information may be gathered over a number of sessions, during a registration and interview process, or during the particular use of the system. Characteristics of the user may thus be stored and used to control content delivery. These characteristics are especially applicable where the selection of information corresponding to an identification code is not made or fully made a priori, or where additional information is desired to be directed to a user based on his characteristics. These identified user characteristics also allow demographic targeting of musical selections and/or additional marketing-related information. In conjunction with an audio clip, an explanatory narration may also be provided.

Where a registration database is employed, or a user identifies him or herself, a complex process may be implemented for determining the exact information signal to be transmitted in response to a user input. For example, a user with a demonstrated preference for "ballads" would be preferentially provided with a ballad selection from an identified audio compilation. Further, the system may also suggest other selections to the user, or provide information unrelated to the identified objects as either audio information or through a visual display. For example, in a department store environment, the system might be used to provide information about perfumes and/or cosmetics, and to provide further information about possible choices of other perfumes and cosmetics not specifically selected by the user.

The system is preferably deployed in a retail environment, where, for example, all merchandise is bar coded using a common format, e.g., UPC codes. Therefore, the user may be a consumer, and the receiver provided with a bar code scanner adapted for reading UPC codes or other simple bar code. The user may then scan the bar code of an object to receive information relating to that object. Further, as stated above, the system may adapt information delivery based on the history of use, to target information to that consumer. Demographic targeting may also be employed. For example, if the consumer likes goods of a particular character, or from a particular source, further information may be provided relating to goods of like character or from the same source. Further, information on complementary goods may also be provided. In this case, it is preferable to include a feedback system from the consumer to the system to control the information delivery, in order to optimize the information delivery. Further, a visual display may also optionally be provided in conjunction with the receiver to provide additional information, such as text, including object description, specifications and price, or graphics. Typical text information also may include associated information, suggestions to the user, such as similar items, and the like. Therefore, the object need not be limited to an audio CD or music-related object, and in fact may be any coded object.

Where no specific selection is requested, an addressable system may present background audio or promoted music, possibly tailored to the personal taste of the user, as determined by history of use and/or demographic information.

The present system also allows processing of a sequence of transmitted information, based on an inferred desire by the consumer for other information or based on a marketing paradigm of the retail establishment. In this case, this sequence of information may preferably be interrupted for explicit information requests. In this way, a user need not continuously request selections, and may make selections intermittently and receive a continuous or near continuous program.

Thus, the object identification may relate concretely or abstractly to the information downloaded.

The portable receiver may also include further controls for modifying presentation of the transmitted information, such as fast forward, reverse, next clip, previous clip, next disk, previous disk, pause, related disk (same artist, genre, next disk on an ordered list, same label), or absolute identification of a disk. Further, the mobile receiver may also accept voice commands from the user, in which case the voice signal is preferably uplinked to the central system for speaker independent analysis and processing. Such portable receiver controls are thus transmitted to the central system through a communication system.

According to one embodiment, upon accepting the mobile receiver, the user identifies himself, and a long term record of that user's activities in the shop or within a broader network may be retrieved. The user then browses the shop, and when he or she finds a potentially desirable item, uses the bar code scanner to scan the bar code, which may be a UPC code or another code affixed to the item or a location in the store. This bar code is then transmitted to a central system, along with an identifier of the mobile receiver, and in turn the user. The central system then transmits a selection corresponding to the code over a communication channel, to which the mobile receiver is also tuned, by way of a coded transmission on a control channel identifying the receiver and the channel assignment. The selection is played through the headphones. The selection will generally be a portion of a CD, e.g., 45 seconds, selected automatically based on the CD identification, preselected by a system operator, or based on characteristics of the user maintained in a database. Buttons associated with the transmitter of the headset/receiver also allow further input to the central system, such as track selection, fast forward, and access to related items, such as records by the same artists or of the same type.

Multichannel Information Transmission System

The present invention presents information records to a plurality of mobile receivers simultaneously. In general, these entail wireless transmission methods, such as radio frequency, infra red, and/or ultrasonic transmission methods. Where portability is not required, a physical transmission medium such as copper wire or fiber optics may be employed. The present system also allows use over AC power lines as a common transmission medium.

Since the preferred information is audio information, and more preferably music, the delivery of information must be such as to allow real time reproduction by each of the receivers of the desired selection. Further, the preferred systems are inexpensive and employ relatively simple receivers which do not require high speed digital signal processing to extract a message from the transmission medium. Thus, addressed information packets including encoded audio data are not preferred.

The information is preferably audio, the quality of which may vary depending on the application. Digital transmission may vary between telephony grade monaural, e.g., 50 Hz–4 kHz analog or 8 kHz, 4 bit ADPCM digital format and high fidelity stereo, e.g., 10 Hz–25 kHz analog or 48 kHz/16 bit digital stereo signals. Other quality levels between these extremes are also known. The information may also be digitally compressed, in a lossless or lossy compression algorithm. The audio signal may also be transmitted as an analog signal.

According to one embodiment, the portable receiver receives an analog signal transmitted on a channel within the 900 MHz band at low power. An uplink from the portable receiver to the central system may be, e.g., an encoded infrared beacon or a radio frequency signal on a control channel either within the 900 MHz band or on a channel which makes redundant use of RF receiver components. Further, according to one embodiment, the receiver includes a digital-controlled phase locked loop tuned receiver for selecting a receive channel, so that receivers may be reprogrammed or dynamically reprogrammed at different frequencies by a digital control signal. Alternately, analog phase locked loop tuning, may be used to lock on to a transmission channel. Where two (or more) receivers are to receive the same audio information simultaneously, they may be tuned to the same frequency.

In another system, a limited number of selections are preselected for presentation. For example, about 100 songs may be simultaneously selected. These may then be stored in frequency division multiplex format on an analog storage medium, such as video tape. A typical video tape such as VHS or S-VHS format has a bandwidth of approximately 6–8.4 MHz. Therefore, with a 200 kHz channel spacing, such a tape will hold about 30–44 channels. In this case, 3 to 4 videotape player systems may be set up, with the outputs of each modulated onto suitable carriers, such as within the 900 MHz band, to simultaneously play the selections. Of course, using narrower channel spacing, single sideband transmission and/or a greater number of channels, an increased number of selections may be provided. Further, since only clips of music will be broadcast, each channel may be used to broadcast two or three clips in sequence, with a latency before presentation of each.

According to this frequency multiplexed continuous transmission embodiment, a large selection of material is simultaneously transmitted over a block of bands, e.g., 900 to 935 MHz with 0.2 MHz channel spacing. A broadband transmitter may be provided to transmit the signals in a single transmission, which may be individually tuned by the mobile receivers to receive a single channel. In this case, the control resides primarily in the receiver and the transmitter is relatively unintelligent. Further, since the channels are pre-assigned, multiple receivers may share the channel without mutual interference.

In an alternative embodiment, selections are time division multiplexed access (TDMA) within the band. With a digital transmission of data at CD audio rates, a 30 MHz band will accommodate about 200 channels. With compression, the number may increase by a factor of 2–4 times.

The database management system services a plurality of receivers simultaneously, and thus includes a system for supplying audio information essentially in real time to a plurality of receivers.

The audio information is reproduced at each receiver. The receiver may buffer the received signal, and therefore the transmission itself may occur at other than real time. Where the receiver includes a buffer, preferably the audio information is in digital form, and may be received at greater than real time rates, allowing reuse of communication channels faster than the duration of the delivered audio information. Further, the buffer need not store the entirety of the audio information simultaneously, but rather may store smaller packets, which are intermittently received, such as in a time division multiplex format.

High bandwidth efficiency is also obtainable through single sideband (SSB) modulation techniques. Such improvements are typically threefold over standard frequency modulated transmissions, but involve an increase in receiver complexity. Other techniques, such as phase shift keying (PSK), quadrature amplitude modulation (QAM), and other known digital or analog modulation techniques may also be used as desired.

The present system also allows a combination of addressing and accessing methods to be employed. For example, a block of channels may be dedicated to continuous broadcast of top 100 album clips, which additional channels may be allocated to selections which are not predetermined. In this manner, commonly requested selections are readily available and infrequently requested selections may be accommodated as well.

It is noted that in an addressable receiver system, where two receivers are to receive the same signal at the same time, they may share the same channel assignment in order to improve system bandwidth efficiency.

A cellular-type system may also be employed in order to maintain system capacity with a large number of users over a relatively large area, as compared to a cell size. In this case, a signaling channel may communicate channel assignments to each receiver. Such a system also allows localization of the receiver, and therefore the user, within the environment, which may provide useful marketing or demographic information and/or allow targeted promotional information to be presented. In general, a cell based system may be advantageous in large installations, in order to increase the apparent number of available transmission channels.

In a system which allows tuning or retuning of the receiver, the system allows an arbitrary number of receivers albeit with a maximum number simultaneously receiving different information. Where the information is of limited duration, a latency may be required before a channel becomes available for use or reuse. Preferably, the system transmits on a band between about 49 MHz to about 1.6 GHz, and more preferably in a commonly used voice band, e.g., 49 MHz, 450 MHz, or 900 MHz. Preferably, a transmitter of the system allows between about 8 to 128 simultaneous users, with one or more transmitters in a system. In another embodiment, an infrared beam is modulated to contain the transmitted information. This infrared channel may be provided either as a full environment channel or in a cell-based approach, with infrared beacons providing a modulated infrared beam localized to a portion of the environment. The receiver is therefore a photodetector sensitive to the infrared spectrum, e.g., about 960μ, preferably with an associated amplifier and background illumination suppresser circuit. A number of standards exist for this function, including IrDA. In fact, in a cellular infrared protocol, the audio information itself may be digitally modulated onto localized beams, which are TDMA multiplexed onto the IR transmission. With a 4 Mbit/s capacity (IrDA), about 20 or more receivers may be serviced per cell to receive CD quality audio (16 bit, 44 kHz sampling stereo signal). Further channel capacity may be obtained by data compression.

Thus, with cellular IR, no RF channel need be employed. In order to control the cellular system, the mobile receiver need communicate to the system the cell location. This may be accomplished by use of a transmitting IR LED on the receiver, which periodically transmits a coded signal identifying the receiver. Optionally, this coded signal may also identify any IR signals it is receiving concurrently, to identify interfering transmissions and possibly location within a cell. A central control determines which system receiver detects the coded signal and/or which system transmitter(s) are nearest the receiver, and controls the portable receiver to receive from the nearest or best cell. With highly directional IR transmitters mounted, for example on the ceiling, a typical record store may accommodate a number of cells, e.g., 8 or more. Preferably, nearby cells are provided which do not mutually interfere, so that more distant cells may reuse infrared spectrum. According to typical practice, cell zones will overlap slightly, to avoid loss of signal during movement of the mobile receiver. The IR illumination beam may also provide adaptive intensity control, for example where sunlight causes interference or where a receiver is receiving a poor signal. The transmit intensity may be determined by the analyzing a received signal intensity of a mobile receiver or by a feedback signal.

A central system server according to the present invention may therefore control the distribution of information signals to a plurality of receivers, based on inputs received from transmitters associated respectively with the plurality of receivers. In order to maintain mobility of users within the environment, wireless communication schemes are preferred. In addition, standard, low cost componentry is preferred, such as infrared LED band and 100 MHz, 300 MHz, 450 MHz, 900 MHz and 1.6 GHz band FM systems. Further, these systems may employ an addressable receiver architecture, either by signaling on an assigned communication channel or using an encoded address on a common channel.

Mobile Receiver

The mobile receiver has a number of functions, including receipt and processing of the user selection information and receipt of desired information from a transmission channel. The mobile receiver also presents the received desired information to the user in an appropriate format.

In certain embodiments, the mobile receiver transmits selection information to a central system, while in other embodiments, the selection information is processed locally to the mobile receiver. Further, in certain embodiments, each mobile receiver receives information on a preassigned channel, while in other embodiments, the information transmission channel is dynamically allocated. In a still further embodiment, predetermined information is transmitted on a predetermined channel and the mobile receiver tunes to a channel corresponding to a selection criteria.

A. Tuner i) Receiver Preassigned Channel

According to an embodiment of the invention, each receiver is preassigned, either permanently or on a session basis, e.g., during a registration process, a receive channel, so that a receiver is addressed by transmitting over the assigned frequency. The receive channel may be a FDMA frequency or TDMA timeslot.

ii) Receiver Dynamically Assigned Channel

Each of the receivers may also be assigned an address code, and the receiver scans the band for channels transmitting that address code. The receiver may also scan the band for a transmitted object identification code or audio information identifying code corresponding to the desired selection. Further, where a sufficient number of channels are available, a number of audio information selections may be continuously transmitted over different channels, and the receiver selects the receive channel based on identifying information.

The present invention may include a digitally tuned receiver, allowing simple and direct tuning of a desired channel or even a spread spectrum transmission, which may better avoid interference. Digital tuners generally are sophisticated and more complex than analog tuners. A digital tuner preferably receives a transmission of a channel assignment on a digital control channel. The present invention may also include an analog tuner, desirable because of its simplicity and low cost.

In general, for automatic tuning of an analog receiver, a phase locked loop locks onto a transmitted channel carrier. Such a tuner may scan various channels and analyze the content for appropriateness. Where retuning is desired, the PLL is unlocked, and allowed to retune to a next channel in sequence. Where an appropriate channel is found, the PLL remains locked until the selection is complete. After completion, the tuner may commence a scan mode to determine if other transmissions are forthcoming. Thus, in a first instance, each mobile receiver may be encoded with a unique or quasi-unique code which is compared to an encoded signal received in band with the audio transmission. Alternatively, in a second instance, the bar code data of an identified selection is stored in a buffer and compared with a broadcast encoded signal. In either case, the tuner must scan the band to find the desired channel. Of course, hybrid digital-analog techniques may be used, employing approximate coarse digital tuning with analog final tuning, which may expedite channel identification.

An analog tuner may also be tuned by an out of band addressed tuning signal, such as an infrared coded signal which is modulated at a desired tuning frequency. Thus, a receiver may be periodically tuned by a precise input, and phase locked onto a desired signal. Any drift or loss of lock may be periodically corrected.

Digitally tuned embodiments preferably include a microcontroller for controlling the DPLL and signaling functions. This microcontroller may be a 4 or 8 bit design. An application specific integrated circuit (ASIC) may also be used, with or without a digital microcontroller. Suitable microcontrollers include 80C51 derivatives. Known RF/IF integrated devices and/or single sideband techniques may be used, including use of devices such as the Signetics NE/SA 602, NE/SA 605, NE/SA 612, MC3361, NE/SA 604A, NE/SA 614A, NE/SA 615, HEF4750V/HEF4751V, SAA1057, and TDD1742. See Signetics Data Manual, Volume 1 Communications, AN196, AN197, AN1961, AN1981, AN192, AN1992, AN1993.

The automatic tuning of this simple receiver may be, e.g., a mechanical adjustment or a forced phase lock on a desired channel. To mechanically adjust the tuner, a servo may be used with feedback from the audio output to indicate a desired channel. To force a phase lock, a strong signal is injected to determine a channel. The injected strong signal is removed, and the tuner receives a signal from an antenna at the same phase relationship, allowing the tuner to remain locked on that channel.

According to various embodiments, receivers are preferably manufactured essentially identically, and do not require substantial adjustment for or prior to use. For example, receivers may differ only in a unique identification code. Therefore, each receiver preferably includes an electronically controlled channel selector to dynamically select the channel through which the information is received. The transmission format preferably maintains high fidelity over the intended range of uses, and may be a frequency modulated/frequency division multiplex frequency modulation format. Known digital transmission formats may also be employed.

In one embodiment, the receiver includes identification information, such as a predetermined electronic serial number, which allows each receiver to be addressed, and preferably uniquely addressed within the system. Preferably, a default communication mode allows broadcast addressing of identifier codes, to which only one or a select group of receivers respond. The response may be, for example, the assignment of a frequency band, to which a digital-controlled tuner of the receiver then tunes. Once tuned to a selected communication channel, e.g., frequency or TDMA timeslot, the receiver receives an information signal which generally need not be highly processed for receipt of an embedded control signal. At the conclusion of the information signal, the receiver may be reset to the default communication mode.

In a still further embodiment, an infrared control channel transmits a signal which floods the environment. Each mobile receiver is tuned, e.g., by a crystal, to a base frequency. A tuning frequency corresponding to a difference frequency between the crystal and the channel is broadcast on the infrared channel, addressed to a particular mobile receiver. This infrared signal is mixed with the crystal frequency to produce a tuning frequency, with is locked with, e.g., a phase locked loop. The addressed offset frequency may be periodically rebroadcast to correct any drift or loss of channel.

Where a PLL is provided with a microprocessor, it is possible to demodulate a digital control signal from within the analog signal channel. In this case, the signaling system must know which channel the receiver is tuned to or must transmit on all channels. For example, a long pseudo-random command may be phase modulated onto the analog signal, e.g. an FM signal, which is continuously read and compared to an address string. Where the address matches, a command is then deciphered and executed. This may include digital control of the PLL frequency, or a code to be compared with channel content in a scanning mode. For example, a 900 MHz radio frequency FM receiver is initially tuned to a common control channel, e.g., 901.0 MHz. Modulated data and some noise is present on this channel. The receiver is digitally tuned by way of a microprocessor controlled control parameter. Digital data on the control channel, such as phase shift keyed (PSK) data or quadrature amplitude modulation (QAM) data is demodulated and fed to the microprocessor. For example, with PSK encoding, the PLL control voltage output is conditioned and serially input to the microprocessor. When a message is sent, a pseudo-random string is transmitted which has a low probability of being caused by noise or interference, e.g., a bit error rate (BER) of 10-9 or lower. This string, when recognized, causes the microprocessor to read the subsequent string as a command, which will control the microprocessor to alter the control parameter, e.g., retune to a different frequency, on which an information signal transmission is made. The information signal, e.g., an analog transmission of music, is demodulated and provided to audio transducers for listening. After the information signal is completed, either through a time-out, an end of message signal, or an interruption, the receiver retunes to the control frequency for further use. The receiver may thus be receptive to commands transmitted over the audio channel, such as an end of transmission, interruption or retuning command. Alternatively, the receiver remains insensitive to commands unless tuned to the control channel, and retunes to the control channel automatically after a predetermined time or when there is no analog signal over the audio channel. The control channel may also be modulated separately onto one or more analog channels, especially using signals ordinarily generated by the radio receiver, such as stereo indicator, AGC level, single sideband transmission, subcarrier signal, or as a digital signal imposed on the analog channel. The RDS technique may also be used. Therefore, the microprocessor may receive input from any of these signals as available.

The control channel may also be provided separately from the selected information receiver. For example, a microprocessor-controlled RF tuner may include a dual receiver system. Preferably, a control channel receiver makes use of components present in the receiver in any case, such as an IF or tuning frequency. Thus, a separate demodulator with a common tuner may be provided for determining control commands.

iii) Transmitted Information Preassigned Channel

In an embodiment where the information is transmitted on a predetermined channel, a mobile receiver need only tune the correct channel within the band to hear the selection. In the case of channel reuse, a predetermined timing may also be accommodated, so that a channel assignment and timing information determines the broadcast content. In this case, a digital tuner with a lookup table to convert bar code information to channel assignment may be used. Alternatively, a subcarrier or other in-band information may transmit the identifying bar code information, and each mobile receiver tuner searches the band for a channel which transmits a code corresponding to the transmitted bar code, which may be buffered by the receiver during scanning. Once the appropriate channel is identified, the tuner of the receiver may lock onto this channel with a phase locked loop. In FM band systems, the RDS standard may be used to transmit the coded information, and likewise, in other bands the same principles may be applied to transmit digital data on a suppressed carrier subcarrier in the channel.

Where each a receiver is assigned a unique channel assignment, channel switching control is unnecessary. However, this limits the number of receivers to the number of available channels and requires specific identification of any receiver to be replaced due to loss, malfunction, etc.

In a further embodiment, a receiver is temporarily assigned a channel for a session, during a registration process. For example, a PLL radio receiver is tuned upon registration by locking onto a tuning frequency, and is expected to remain locked onto a carrier for a relevant time period, without significant loss of lock. Therefore, any information signal within the allocated frequency band will be tuned and therefore reproduced as audio information. An out-of-band control signal from the user uplinks to control the information sent through the predetermined communications channel. For example, an infrared transmitter similar to those employed in known consumer infrared remote control devices may be employed to transmit information from the user to the central system, in an encoded message including the identity of the user or receiver and the control information, or the channel assignment.

According to another embodiment, a tuning signal is stored in an electrically erasable read only memory or memory cell as an analog potential or digital value. Such a system generally operates with a PLL oscillator, and will exhibit greater stability and reduced susceptibility to interference than a PLL oscillator which does not have a pre-tuned set-point. Therefore, upon registration, the receiver is programmed with a specific frequency in a memory, which remains assigned until re-registered. In this system, the uplink control channel may be generally unrelated to the tuned channel. This embodiment does not, however, address the issue of channel re-utilization, and therefore the number of receivers registered is limited to the number of available channels.

B. Information Selection

The mobile receiver allows the user to indicate which information is desired. Preferably, this information is automatically acquired from an object in the environment, such as by swiping a bar code reader or other automated object identification method. As stated above, this information is processed so that the desired selected information is received, either by tuning the receiver, transmitting information to a central system, or both.

The mobile receiver may thus transmit control codes to the central system through a communication system which may be the same as the object identification information, although this is not necessarily required. For example, the object identification may be transmitted as an RF signal, while the control information may be transmitted as a modulated infrared signal. Where object identification and control signals share a common transmission system, preferably they operate according to a unified predetermined protocol which identifies the receiver and the information or control command to be transmitted, with message collision detection and avoidance and possible error detection and correction. The control codes may also operate independently of information delivery channel, and employ a different transmission scheme, such as an infrared channel.

The communication protocol between the mobile receiver and the central system, for controlling the transmission and/or reception of audio data, may be open loop information transmission, with command receipt verification by way of actual delivery of the desired audio signal, or closed loop with a bi-directional communication and/or negotiation of control information. The bi-directional communication may be full or half duplex, and the communications channels may be the same or different.

The object identification is preferably a bar code, magnetic stripe, or RF-ID device on or associated with the identified object. Thus, where a UPC code or coded antitheft device is associated with the object, this may also be employed for purposes of the present invention to provide for object identification. In the preferred embodiment of the invention, a UPC code is visibly printed on packaging of a musical CD, and may be detected optically using known bar code reading methods. According to the present invention, the object identification is preferably acquired as a direct and automated transfer of information without intermediate human processing of the information. Thus, while the system may employ a keypad for keying a numeric code or SKU number, or a keyboard for manually entering an identification, the preferred system does not require these manual steps. Of course, such a keypad or keyboard may be provided, for example for communication of information other than the object identification.

The control information for the system may thus be derived from an identifying bar code found on objects in the environment, so that the bar code is scanned and retransmitted along with a receiver or user identification code. Advantageously, according to one embodiment, the LED and photodetector employed for bar code scanning may also be employed for communication with the central system, such as by storing the bar code in a first operational phase and retransmitting it in a second phase. The presence of a photodetector allows implementation of a bi-directional protocol to control information flow and ensure receipt of a message. Thus, a user scans a bar code on an object with a bar code reader, which may indicate successful acquisition of the object identification with a tone, either through a separate audio transducer or through the headphones. The photodetector of the bar code reader then senses a clear path to an infrared receiver in the environment, such as by detecting an infrared transmission from an infrared transmitter near the infrared receiver, e.g., mounted on a ceiling, and also detects that there are no other transmissions occurring simultaneously, and transmits an identifier of the receiver or user and the object identification information as a modulated infrared signal to the infrared receiver. The infrared transmission may include redundancy, as well as error detection and correction codes. When the information has been received by the infrared receiver, a confirmation may optionally be transmitted, either through the infrared transmitter, or through another channel, e.g., a radio frequency channel. The audio information is then transmitted over a radio frequency channel, e.g., as FM modulated analog stereo audio signals on a channel in the 900 MHz band. The receiver may determine the channel in a number of ways. The channel assignment information may be transmitted through the infrared transmitter, as a modulated infrared transmission including the receiver or user identifier and channel assignment identifying information. The channel assignment may also be transmitted over a control channel in the radio frequency band as a digitally encoded signal. The receiver may further scan the radio frequency band to find a channel which includes information corresponding to the request. At the conclusion of the audio information transmission, a code may be transmitted which deactivates audio signal reception at the receiver, which may again be through an infrared signal, an RF signal on a control channel, or an RF signal included in-band with the audio information channel.

In certain embodiments, the bar code is modified for transmission with the addition or error detecting/correcting codes prior to transmission, and a robust communication protocol may be employed. This may include packetized transmissions, automated retransmissions, and bi-directional confirmation messages. The bar code may also be transmitted in raw, unprocessed form, either directly corresponding to the bar code reader output or in minimally processed form.

As referred to in conjunction with the present invention, bar code is used to represent any of the imprinted codes which are read optically, and therefore include the so-called 2D bar codes, bull's eye codes and the like, and is not limited to UPC codes, 3 of 9 codes or other known systems having parallel imprinted lines. Preferably, the bar code reader requires low power, is compact, and operates with a simple swipe or other simple action by the user.

C. Information Delivery Control

Where the transmission channels are allocated dynamically, each mobile receiver preferably transmits information identifying the user and/or receiver and an object identification to a central system. In one embodiment, all receivers within an environment share an infrared channel in a time division multiplexing scheme or collision avoidance protocol. Information to be uplinked may be buffered and transmitted when the infrared channel is clear, as indicated by an absence of activity detected by a photodetector, or retransmitted if the signal is not properly received as determined by a feedback signal. Collision avoidance and detection/retransmission schemes known in the art may be suitable for ensuring reliable uplink. A reply from the central system that the uplink was successful may occur through an infrared channel, including the same channel as the uplink, through a radio frequency audio channel, or possibly through an ultrasonic channel. Therefore, the receiving device attempts to upload the encoded data, using a protocol designed to avoid interference between various receiving devices, and after successful receipt of the transmission, a signal is sent to the receiving device. Thereafter, the mobile receiver is tuned to the correct channel, either by receipt of a channel assignment or scanning of the band for a transmission corresponding to the object identification or the receiver address, and the selected audio signal is presented through audio transducers to a user.

Thus, according to one group of embodiments, the central system receives an identification of the desired audio information as an object identification. After receipt, the object identification is correlated with identified objects in an information library or database. In some cases, the information in the library will be suitable for direct transmission, and in others, a selection or processing step is necessary, as the provided object identification information is insufficient to fully define the information to be transmitted.

In one embodiment, the audio information is broadcast, and the object identifying data is used to selectively receive the broadcast audio information. Thus, the receiver selects a channel for reception based on the object identification information. According to this embodiment, the receiver may produce a transmission to commence delivery of desired information, or the information may be broadcast without such transmission, such as through a continuous repetitive broadcast.

Thus, the transmission channel on which audio information is delivered may be explicitly predetermined and communicated to the receiver prior to transmission, or the receiver may scan the communication band to identify the desired audio transmission.

D. Mobile Receiver

The mobile receiver typically consists of a stereo headphone set with an attached bar code reader, which also houses a display and the power source. Where infrared communications occur with ceiling mounted infrared communication modules, the infrared LED and photodetector may advantageously be mounted in the same housing as the headphones, facing upward. The display may be used to present price, track number, error messages or other information. The reader housing may also include controls for volume, stop, pause, relative movement (fast forward, reverse, beginning, end, and skip. The display may also be used to selectively present to users targeted information, such as special promotions, or information otherwise believed to be of interest. Of course the user is free to take off the headset or generally override such messages not requested with a specific request.

According to one embodiment, it is preferred that the receivers be of low cost, with functionality included in the centralized system where possible. Therefore, the monetary risk of loss or damage to the plurality of receivers may be minimized. Further, a high level of electronic integration of the mobile receivers is also desired. The size, weight, and power consumption are each desired to be minimized. Therefore, the system preferably operates off 3 VDC or less, with low cost primary or rechargeable electrochemical power supply, e.g., lithium or alkaline primary batteries, nickel cadmium, nickel metal hydride or lithium rechargeable batteries or a super capacitor (low voltage, high capacitance device optimized for energy storage capacity). In another embodiment, the entire receiver is disposable, including a simple receiver and audio transducer, and therefore functionality of this embodiment may be sacrificed to achieve extremely low cost. For example, a bar code scanner associated with the central system may be used to scan a bar code on an object as well as a bar code associated with the receiver. The receivers may be pre-tuned, or automatically tuned by physical link with the central system, e.g., during the identification process.

The mobile receiver according to the present invention may thus exclude a bar code reader or other object identification system. In this case, a fixed or stationary bar code reader or object identification system is provided which reads a bar code or the like on the object, e.g., audio CD, as well as the mobile receiver, both of which are transmitted to the central system through a fixed installation or through a wireless communication system. In this case, a so-called "Audio Button" (Philips Electronics, N.A.) may be employed as the mobile receiver. Alternatively, a headphone jack may be provided near the bar code reader, in which case only the object identification need be transmitted to the central system for operation. Of course, in a hard-wired system, user mobility is limited.

In one embodiment, the system according to the present invention is deployed within a record shop, where consumers are mobile and free to browse a large selection of compact disks or records. Upon entry into the shop, consumers are offered a mobile receiver, including a personal headset and bar code scanner, which is loaned to them while in the store. An egress alarm may be employed to prevent loss of the mobile receiver devices through a portal, e.g., a door. This alarm may be of known type, e.g., an antitheft RF/ID system or a specialized system employing the electronics within the mobile receiver. Where the electronics of the receiver are employed to signal the system that a receiver is leaving the premises, an antitheft system for the objects in the environment may also be correspondingly implemented so that a single system is employed. Where the receiver is modular or includes a connecting cord, each element preferably includes a separate antitheft component.

EXAMPLE 1

Figure 2:
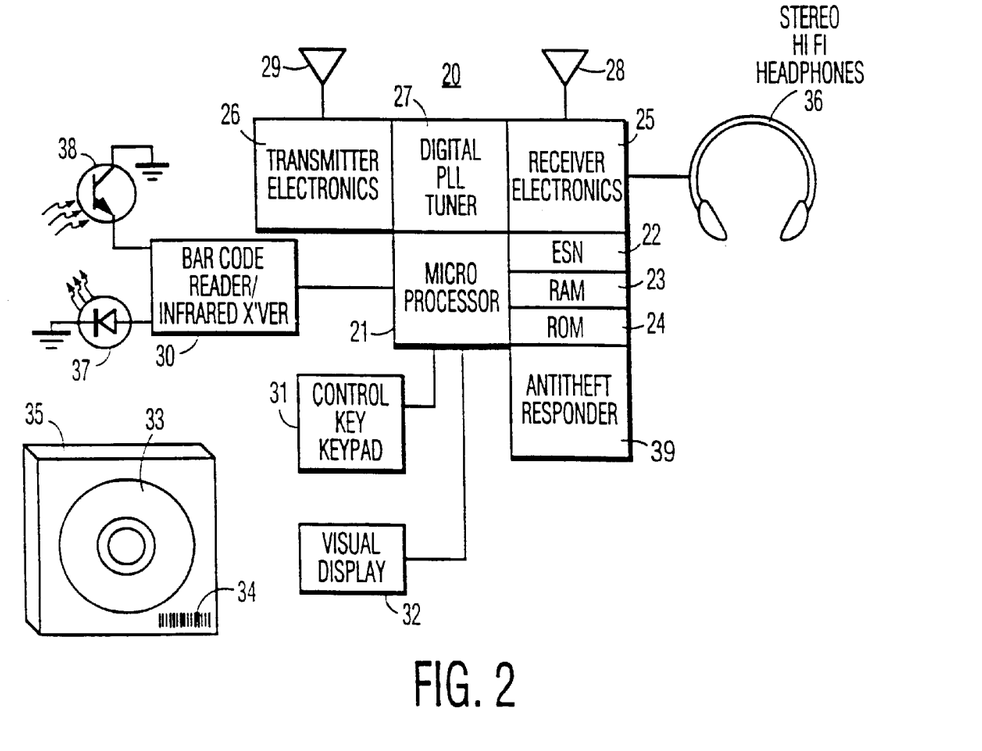
FIG. 2 is a block diagram of a receiver according to the present invention.

A plurality of digital phase locked loop RF receivers 20, as shown in FIG. 2, are provided each having a microprocessor 21 control. Each receiver has a unique address code, an electronic serial number 22 (ESN). During idle mode, the receiver 20 is tuned to a control channel, and awaits an addressed command. The receiver also includes an antitheft responder 39, which may be activated by RF excitation at portals of an establishment. Where a user desires to initiate a transmission, he scans a bar code 34 on the packaging 35 of a CD 33 with a bar code reader 30 attached to the receiver 20. Once scanned, the bar code 34 information is processed to include error detecting and correcting codes and transmitted using an infrared LED 37 to a ceiling mounted detector. This infrared LED may be the same LED used to illuminate the bar code 37 for scanning. Using the radio transmission on the control channel, the central system controls the timing of the uplink of data by the infrared system, as well as any required retransmissions. Thus, the central system determines when the infrared channel is or should be clear. The transmission also includes the address serial number 22 of the receiver 20.

Figure 5:
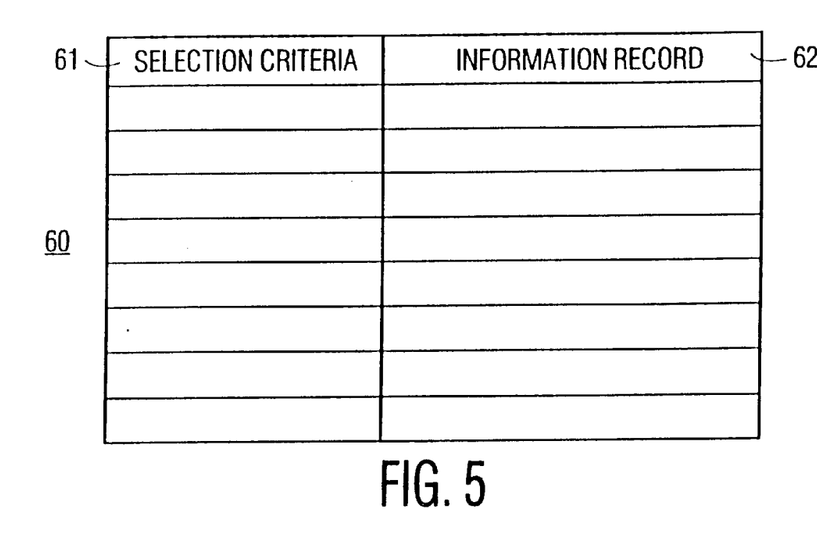
FIG. 5 is a diagram of a simple selection criteria database according to the present invention.

The central system then accesses a database record corresponding to the bar code 34 information. As shown in FIG. 5, a simple table structure may be provided which associates a selection criteria 61 with an information record 62.

The central system includes a mass storage database for musical clips, such as a random access magnetic storage system (hard disk or hard disk array). The stored information in the central system is stored in a mass storage medium as digital information, and is converted to a high fidelity analog signal for modulation of a transmission. A high speed modem or telecommunications link is provided to the central system to allow remote system maintenance, updating of musical selections, and exchange of statistical data with content providers or service operators. This central system is also integrated with the retail store management system, allowing pricing information and promotional material to be transmitted to mobile receivers, and to allow selection of musical clips, and to locate mobile receivers within the retail environment.

The receiver 20 then awaits a command on the control channel addressing the receiver 20 and identifying an allocated channel for transmission, which may be delayed until the requested information is available. Once available, the channel and address are transmitted, and the receiver receives the transmission through an antenna 28 and responds by changing channels with a digital PLL tuner 27 to the indicated channel. A further confirmation by infrared transmission using the infrared LED 37 may also occur.

An embedded code in the information channel indicates serves as an auxiliary control channel, and allows control over the receiver 20 when the receiver is not tuned to the control channel. When the information delivery is over, a code is transmitted indicating that the receiver 20 should retune to the control channel and await further instructions. The receiver also has a time-out mode, so that if no valid command is received for about 2 minutes, the receiver 20 automatically retunes to the control channel.

The receiver has an electronic application specific integrated circuit (ASIC), including an 80C51 derivative microcontroller 21, a digital PLL tuner 27, an electronic serial number 22, RAM 23 and ROM 24. Radio frequency receiver electronics 25 may be provided on a separate integrated circuit. The receiver generates an electronic signal to drive a set of stereo Hi Fi headphones 36.

A bar code reader 30 may optionally function as an infrared transceiver, employing the infrared LED 37 and photodetector 38 as operative elements. Optionally, the receiver may also include an RF transmitter 26, which employs common structures within the application specific integrated circuit, such as the digital PLL tuner 27.

EXAMPLE 2

Figure 1:
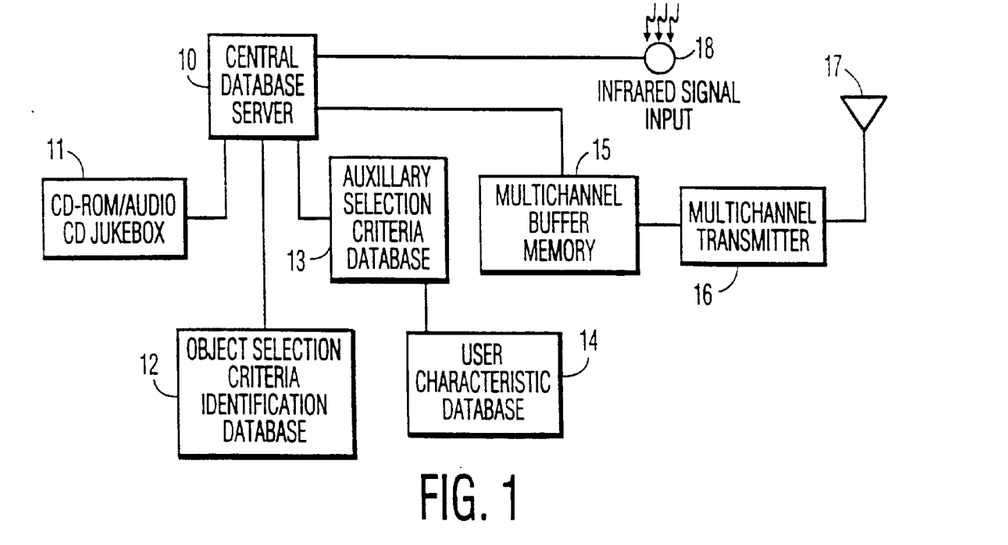
FIG. 1 is a block diagram of a central server system according to the present invention.
Figure 6:
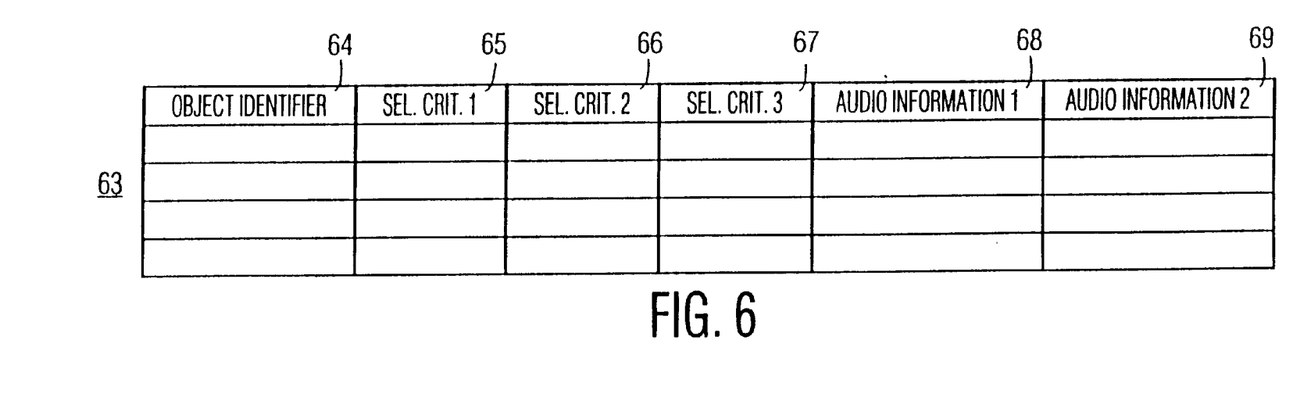
FIG. 6 is a diagram of a multiple selection criteria, multiple related audio information record database according to the present invention.

A database is provided as a series of disks in a CD-ROM/audio CD jukebox 11, holding about 18 disks, as shown in FIG. 1. This database includes selections from each of a large number of audio CD compilations, stored in compressed digital format. Selections from each CD are identified by an index 12 corresponding to a bar code 34 on the packaging 35 of that CD 33. This object identifying index 64 is also shown in FIG. 6. An auxiliary database 13 is provided characterizing the selections on each CD. These are stored in the database records as a series of selection criteria 65, 66, 67. A further database 14 is provided including demographic information characterizing particular users as well as a past history of use.

A user registers with the retail store, so that the identity of the user and the address of the receiver are known, and the user is provided with a receiver 20. The further database 14 is accessed for that user, so that the information is available. The user has a demographic profile as an "average" "middle class" "white" teenager and a past history of use indicates that the user likes a style of music called "heavy metal".

The user scans a bar code 34 of a new CD 33 album, which is transmitted along with the address serial number 22 code of the receiver 20 to an infrared receiver 18 of the transmitter by means of an infrared transmitter 37. Upon receipt, the central system analyzes four available selections, and uses a neural net analyzer to determine which selection 68, 69 most closely corresponds to "heavy metal" and is preferred by those of his demographic profile, based on data included in the further database 14. The selection is then transferred from the jukebox 11 to a random access memory (RAM) buffer 15 and thence transferred in real time to a multichannel radio transmitter 16 over a channel to be assigned to the receiver 20, through antenna 17. The receiver 20 is informed on the control channel of which channel is to be used. The history of use in the further database 14 is updated.

EXAMPLE 3

Figure 3:
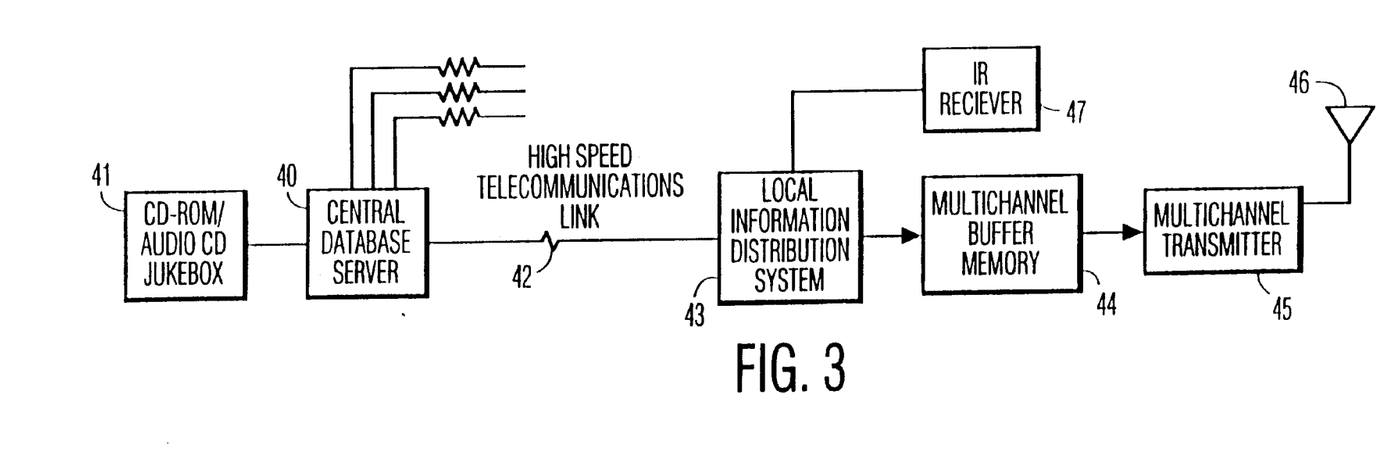
FIG. 3 is a block diagram of a central server having a remote mass storage system of user of the present invention.

A CD-ROM jukebox 41 is provided off-site to a retail establishment. A central database server 40 controls the jukebox 41. The jukebox holds thousands of audio CDs 33. The central database server 40 is connected by means of one or more high speed telecommunications links, e.g., frame relay, to one or more retail establishments each having a local information distribution system 43. The local information distribution system 43 has an infrared receiver system for receiving selection information from a plurality of receivers 20, as well as a multichannel transmitter 45 with a multichannel buffer 44.

A selection criteria is transmitted as a modulated infrared beam from a receiver 20 to the infrared receiver 47. This selection criteria may be locally processed or uplinked directly to the central database server 40. Based on the selection criteria, optionally an identification of the user and his or her characteristics, e.g., the further database 14, a selection is made from a compilation corresponding to the selection criteria.

EXAMPLE 4

Figure 4:
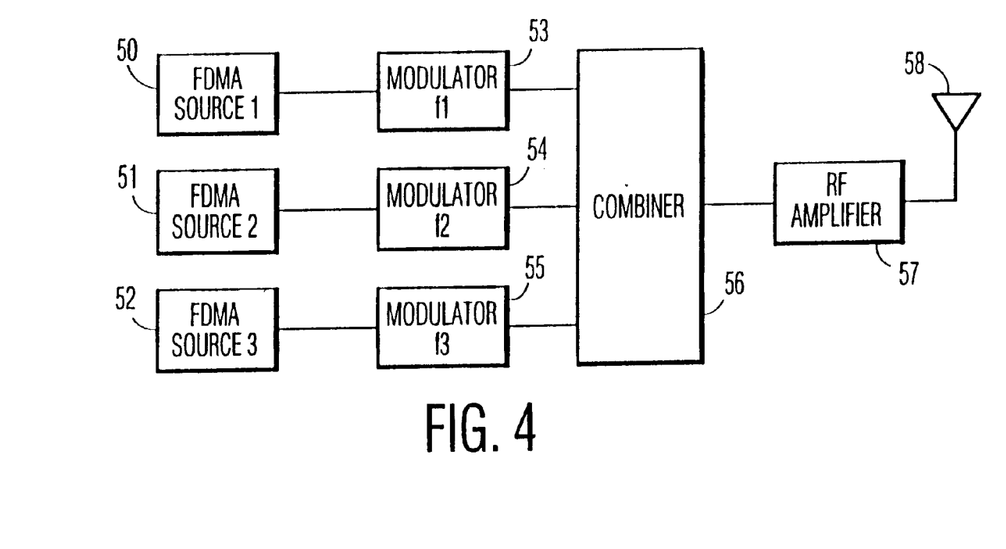
FIG. 4 is a block diagram of a fixed FDMA transmission scheme according to the present invention.

A plurality of audio clips are recorded in FDMA format on helical scan magnetic tapes, FDMA sources 50, 51, 52. The tapes are played, with the output of each source modulated at adjacent frequencies by modulators 53, 54, 55. The outputs are then mixed at combiner 56, and transmitted by amplifier 57 and antenna 58.

Encoded on each audio clip is a digital code corresponding to a bar code 34 on the packaging 35 of a CD 33. A receiver having a bar code scanner receives a bar code input, which is temporarily stored and compared to a received signal as the tuner of the receiver scans the transmitted signals. When the stored bar code matches the received signal, the tuner stops scanning, and an audio mute is held until a beginning of a clip transmission on that channel, after which the audio signal is presented through the headphones.

EXAMPLE 5

Figure 7:
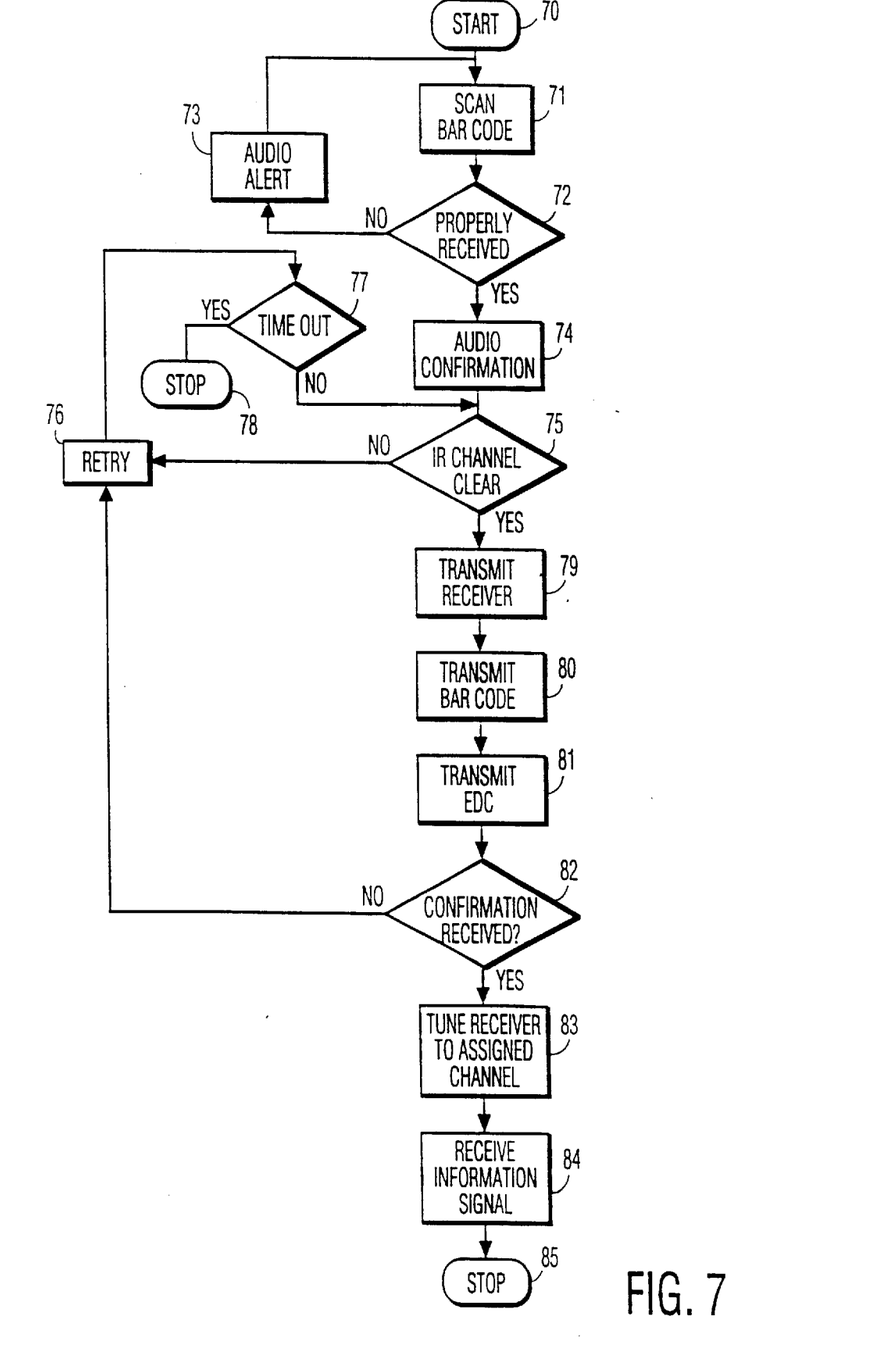
FIG. 7 is a flow diagram of an infrared uplink, radio frequency downlink embodiment according to the present invention.

As shown in FIG. 7, a receiver 20 scans a bar code 71. If the bar code is not properly received 72, an audio alert 73 prompts the user to rescan. When properly scanned, an audio confirmation is generated 74. The bar code data is then uplinked to the central database server 10 system through the infrared signal input 18. A photodetector 38 on the receiver 20 detects whether there is any activity on the infrared signaling channel 75. If there is activity, the receiver retries 76 to transmit, with a timeout 77 if there is an inordinate delay. An audio signal may be generated to indicate a timeout error.

When the infrared channel is clear, the receiver transmits a message including the receiver ID 79, bar code 80, and error detection and correction codes 81. Immediately after transmitting this information, the receiver then seeks to detect a confirmation signal 82, which may be transmitted through the infrared channel to the photodetector 38 or through a radio frequency control channel and detected by receiver 25. If the confirmation is not received, the infrared transmission is subject to a retry 76.

With a confirmation signal, a channel assignment is also transmitted, and the receiver 20 is then tuned to the assigned channel 83. The information signal is then received 84, and the audio information reproduced by the headphones 36.

After the information signal is completed, the receiver returns to an idle state awaiting a new command or input.

EXAMPLE 6

Figure 8:
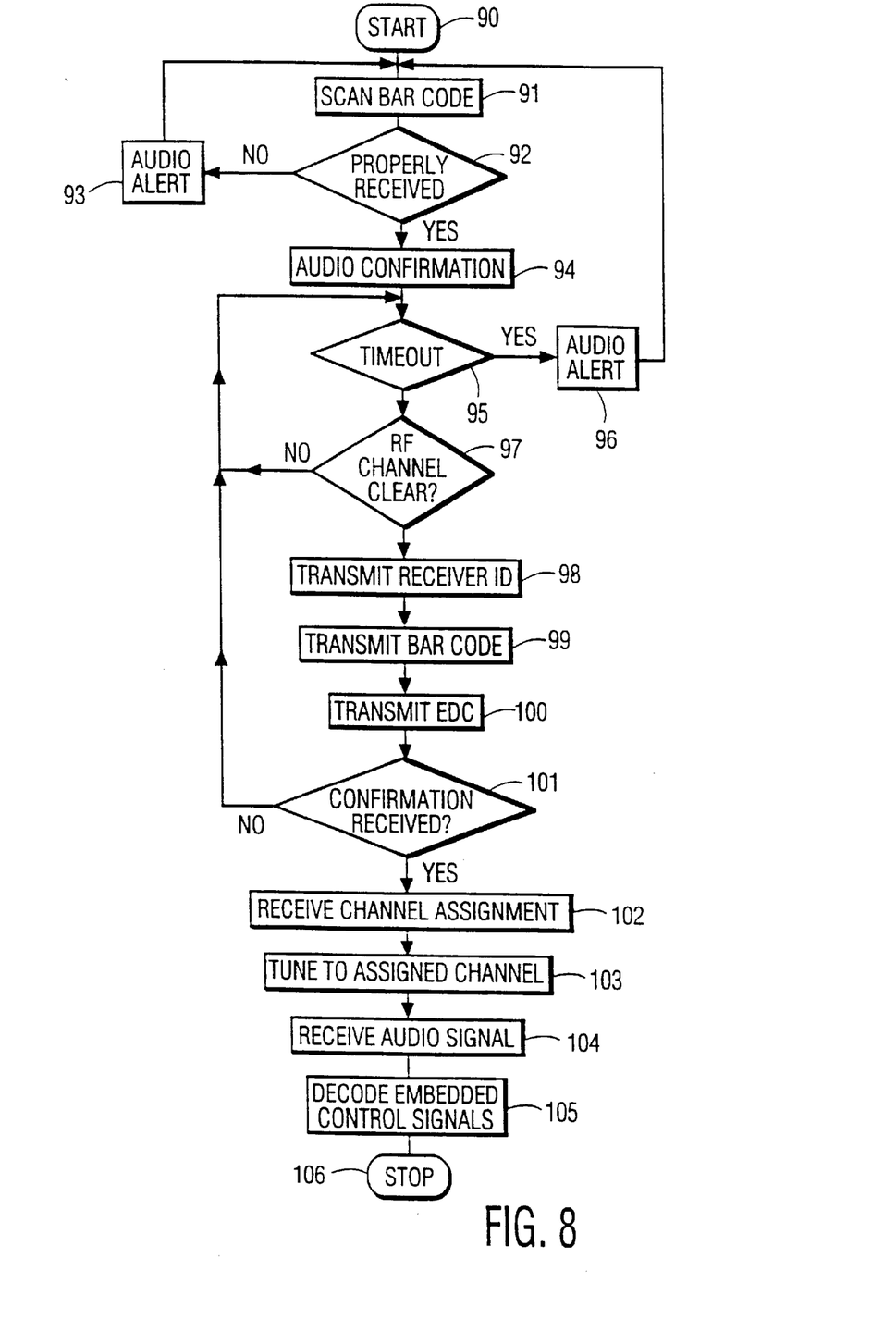
FIG. 8 is a flow diagram of a radio frequency uplink and downlink embodiment according to the present invention.

As shown in FIG. 8, a receiver 20 scans a bar code 91, similar to the method of FIG. 7. If the bar code is not properly received 92, an audio alert 93 prompts the user to rescan. When properly scanned, an audio confirmation is generated 94. The bar code data is then uplinked to the central database server 10 system through a radio frequency transmitter 26 and antenna 29 of receiver 20. The radio frequency receiver 25 on the receiver 20 detects whether there is any activity on the radio frequency signaling channel 97. If there is activity, the receiver retries to transmit, with a timeout 95 if there is an inordinate delay. An audio signal 96 may be generated to indicate a timeout error.

When the radio frequency channel is clear, the receiver transmits a message including the receiver ID 98, bar code 99, and error detection and correction codes 100. Immediately after transmitting this information, the receiver then seeks to detect a confirmation signal 101, which is transmitted through the radio frequency control channel to the receiver 25. If the confirmation is not received, the radio frequency transmission is subject to a retry.

With a confirmation signal, a channel assignment 102 is also transmitted, and the receiver 20 is then tuned to the assigned channel 103. The audio information signal is then received 104, and the audio information reproduced by the headphones 36. The received broadcast is continuously monitored for embedded control codes, which may appear as pseudorandom noise on the carrier, which may be demodulated and decoded 105.

The receiver resets to an idle state after the audio selection is complete, or where a timeout failure occurs where no control signals are received for a set period. A control signal may also explicitly place the receiver in an idle mode, wherein the receiver may commence the bar code scanning process again. Further, transmissions may be commenced by the central database server system without prompting or user input, based on a predetermined program, supervisor input, or an adaptive program based on the characteristics of the user.

It should be understood that the preferred embodiments and examples described herein are for illustrative purposes only and are not to be construed as limiting the scope of the present invention, which is properly delineated only in the appended claims.

What is claimed is:

1. A retail store, comprising:
a room in a building, the room containing a plurality of objects each object containing a recording medium, each recording medium storing a first copy of at least one prerecorded music composition, and each object being identified by a unique object identification code;
a plurality of portable terminals, adapted to being carried in the room by respective consumers from object to object, each portable terminal including: means for automatically identifying by the object's identification code an object specified by the consumer who is operating the portable terminal; means for transmitting the object's identification code on a first wireless channel; means for receiving a selected portion of a second copy of the at least one prerecorded music composition on a second wireless channel; and means to present the received selected portion to the consumer carrying the portable terminal; and
a central terminal, including: means for receiving the identification codes from the plurality of portable terminals through the first wireless channel; means to identify which portable terminal transmits each identification code; storage means for storing a plurality of selected portions, each selected portion being a selected portion of a second copy one of the prerecorded music compositions; means for retrieving the selected portion from the storage means; means for transmitting the selected portion to the identified portable terminal through the second wireless channel.

2. The retail store of the claim 1, wherein each portable terminal of the plurality of portable terminals is adapted to have no useful operation outside of and remote from the building.

3. The retail store of the claim 1, wherein each portable terminal of the plurality of portable terminals further comprises an electronic antitheft responder being adapted to help prevent a customer from removing the terminal from the building.

4. The retail store of the claim 3, wherein the antitheft responder is electrically connected to the means for receiving a selected portion of a second copy of the at least one prerecorded music composition.

5. The retail store of the claim 4, wherein each portable terminal of the plurality of portable terminals further includes a microprocessor operatively coupled to the antitheft responder and to a digital tuner, wherein the digital tuner is a portion of the means for receiving a selected portion of a second copy of the at least one prerecorded music composition.

6. The retail store of the claim 5, wherein each selected portion is selected according to a selection criteria, the selection criteria being dependent upon the personal characteristics of the customer operating a terminal.

7. The retail store of the claim 6, wherein the central terminal further includes means for storing a database of user characteristic information including the personal characteristics and means for accessing user characteristic information.

8. The retail store of the claim 7 in which:
the object's identification code is on the surface of the object;
the object's identification code is a bar code; and the automatic reading means is a bar code reader with an LED and photodetector;
the first wireless channel is an infrared channel using the same LED as the bar code reader;
the second wireless channel is a radio frequency broadcast channel;
the second wireless channel for each respective portable terminal is a different respective FDMA or TDMA sub-channel;
the information includes audio information and the presentation means of the portable terminals include headphones;
the displayed goods include audio recordings, and the information related to the goods includes selections of the audio recordings;
the central terminal being capable of transmitting different respective audio information in real time to multiple terminals in the same room;
the customer using a portable terminal is identified and the information transmitted to the portable terminal depends on the customer identification.

9. The retail store of the claim 7, wherein the selected portion depends upon the user characteristic information, and the user characteristic information includes at least one of information relating to a past use of the building by the customer and demographic information about the customer.

10. The retail store of the claim 9, wherein the selected portion is limited to a portion of a song, unless personal characteristics of the user warrant a larger selected portion.

11. The retail store of the claim 10, wherein the portion of a song is the first 45 seconds of the song.

12. The retail store of the claim 11, further comprising an egress alarm adapted to help prevent removal of the terminals through a portal of the building.

13. The retail store of the claim 11, wherein each of the terminals includes a simple receiver and an audio transducer and is disposable.

14. The retail store of the claim 11, wherein each of the terminals is adapted to be given free of charge to a customer.

15. The retail store of the claim 11, wherein each of the terminals is adapted to be loaned to a customer for use by a customer free of charge while the customer remains within the building.

* * * * *